United States Patent
Critchley et al.

(10) Patent No.: US 11,034,298 B2
(45) Date of Patent: Jun. 15, 2021

(54) VEHICLE SURROUND VIEW SYSTEM FOR IDENTIFYING UNOBSERVABLE REGIONS WHILE REVERSING A TRAILER

(71) Applicant: Continental Automotive Systems, Inc., Auburn Hills, MI (US)

(72) Inventors: James Hockridge Critchley, Lake Orion, MI (US); Jesse Aaron Hacker, West Bloomfield, MI (US); Tony Moussa, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/686,304

(22) Filed: Nov. 18, 2019

(65) Prior Publication Data

US 2021/0146835 A1   May 20, 2021

(51) Int. Cl.
*G06T 3/00* (2006.01)
*G06T 15/20* (2011.01)
(Continued)

(52) U.S. Cl.
CPC .............. *B60R 1/00* (2013.01); *G06T 3/0018* (2013.01); *G06T 15/20* (2013.01); *H04N 5/247* (2013.01); *H04N 7/18* (2013.01); *B60R 11/04* (2013.01); *B60R 2011/004* (2013.01); *B60R 2300/102* (2013.01); *B60R 2300/105* (2013.01);
(Continued)

(58) Field of Classification Search
CPC ................ B60R 1/00; B60R 2300/102; B60R 2300/105; B60R 2300/303; B60R 2300/607; B60R 2300/802; G06T 15/20; G06T 15/205; G06T 2200/08; G06K 9/00805
See application file for complete search history.

(56) References Cited

U.S. PATENT DOCUMENTS 7,161,616 B1 *   1/2007   Okamoto .................. B60R 1/00
                                                           348/148
9,242,602 B2 *   1/2016   Corcoran ............... H04N 5/247
(Continued)

FOREIGN PATENT DOCUMENTS

WO        2019093176 A1    5/2019

OTHER PUBLICATIONS

Interational Search Report and the Written Opinion of the International Searching Authority dated Jan. 27, 2021 for the counterpart PCT Application No. PCT/US2020/070802.

*Primary Examiner* — Brian P Yenke (57) ABSTRACT

A method and system identifies an unobservable region using a surround view system of a vehicle. The vehicle has a trailer attached thereto. The surround view system includes cameras to provide a view of an area surrounding the vehicle, an ECU receives image data from the cameras, and a display. A legacy observable image of the area obtained from the cameras as the vehicle passes through the area is stored in the ECU. A model representing a geometry of the trailer is created. Live images of the area, while the vehicle is reversing the trailer in the area, are obtained by the cameras. The trailer defines an obstruction in the area that occludes camera views defining an unobservable region. Based on the legacy observable image, the geometry of the trailer, and the live images, the unobservable region in the area is calculated and displayed on the display.

17 Claims, 7 Drawing Sheets

(51) Int. Cl.
  *B60R 1/00* (2006.01)
  *H04N 7/18* (2006.01)
  *H04N 5/247* (2006.01)
  *B60R 11/04* (2006.01)
  *B60R 11/00* (2006.01)

(52) U.S. Cl.
  CPC ... *B60R 2300/303* (2013.01); *B60R 2300/607* (2013.01); *B60R 2300/802* (2013.01); *G06T 2200/08* (2013.01)

(56) References Cited

U.S. PATENT DOCUMENTS

| | | | | |
|---|---|---|---|---|
| 9,751,561 | B2* | 9/2017 | Herzog | B62D 13/06 |
| 9,779,313 | B2* | 10/2017 | Pliefke | G06K 9/00805 |
| 10,093,233 | B2 | 10/2018 | Krokel et al. | |
| 10,362,230 | B2* | 7/2019 | Watanabe | B60K 37/02 |
| 10,464,555 | B2* | 11/2019 | Heimberger | B60W 30/18036 |
| 10,486,599 | B2* | 11/2019 | Baur | B60R 1/06 |
| 2014/0125583 | A1* | 5/2014 | Aoki | B60K 37/02 |
| | | | | 345/156 |
| 2014/0267688 | A1* | 9/2014 | Aich | B60W 50/0097 |
| | | | | 348/113 |
| 2016/0075281 | A1* | 3/2016 | Singh | B60R 1/00 |
| | | | | 348/118 |
| 2016/0221503 | A1 | 8/2016 | Krokel et al. | |
| 2018/0093619 | A1* | 4/2018 | Han | G06K 9/00798 |
| 2018/0101736 | A1* | 4/2018 | Han | B60R 1/00 |
| 2018/0188037 | A1* | 7/2018 | Wheeler | B60W 40/02 |
| 2018/0197417 | A1* | 7/2018 | Burtch | G08G 1/167 |
| 2018/0246515 | A1* | 8/2018 | Iwama | B60W 30/06 |
| 2018/0265004 | A1* | 9/2018 | Kudou | B60R 1/00 |
| 2018/0336787 | A1* | 11/2018 | Ohnishi | G08G 1/167 |
| 2018/0356527 | A1* | 12/2018 | Kozak | G01S 17/931 |
| 2019/0052843 | A1* | 2/2019 | Izumi | H04N 5/2257 |
| 2019/0086204 | A1* | 3/2019 | Critchley | B60D 1/245 |
| 2019/0088011 | A1* | 3/2019 | Liu | G06T 17/05 |
| 2019/0162856 | A1* | 5/2019 | Atalla | G01S 17/89 |
| 2019/0164333 | A1* | 5/2019 | Fukushima | B60R 1/002 |
| 2019/0265712 | A1* | 8/2019 | Satzoda | B60W 40/09 |
| 2019/0270410 | A1* | 9/2019 | Baur | B60R 1/00 |
| 2019/0340522 | A1* | 11/2019 | Mori | G06N 5/04 |
| 2019/0375330 | A1* | 12/2019 | Kim | G06T 3/4038 |
| 2020/0094739 | A1* | 3/2020 | Ahamed | B60R 16/0315 |

* cited by examiner (Prior Art)
FIG. 1

(Prior Art)

VEHICLE SURROUND VIEW SYSTEM FOR IDENTIFYING UNOBSERVABLE REGIONS WHILE REVERSING A TRAILER

FIELD

The invention relates to reversing a trailer with a vehicle and, more particularly, to a vehicle surround view system that identifies legacy unobservable regions while reversing the trailer.

BACKGROUND

Figure 1:
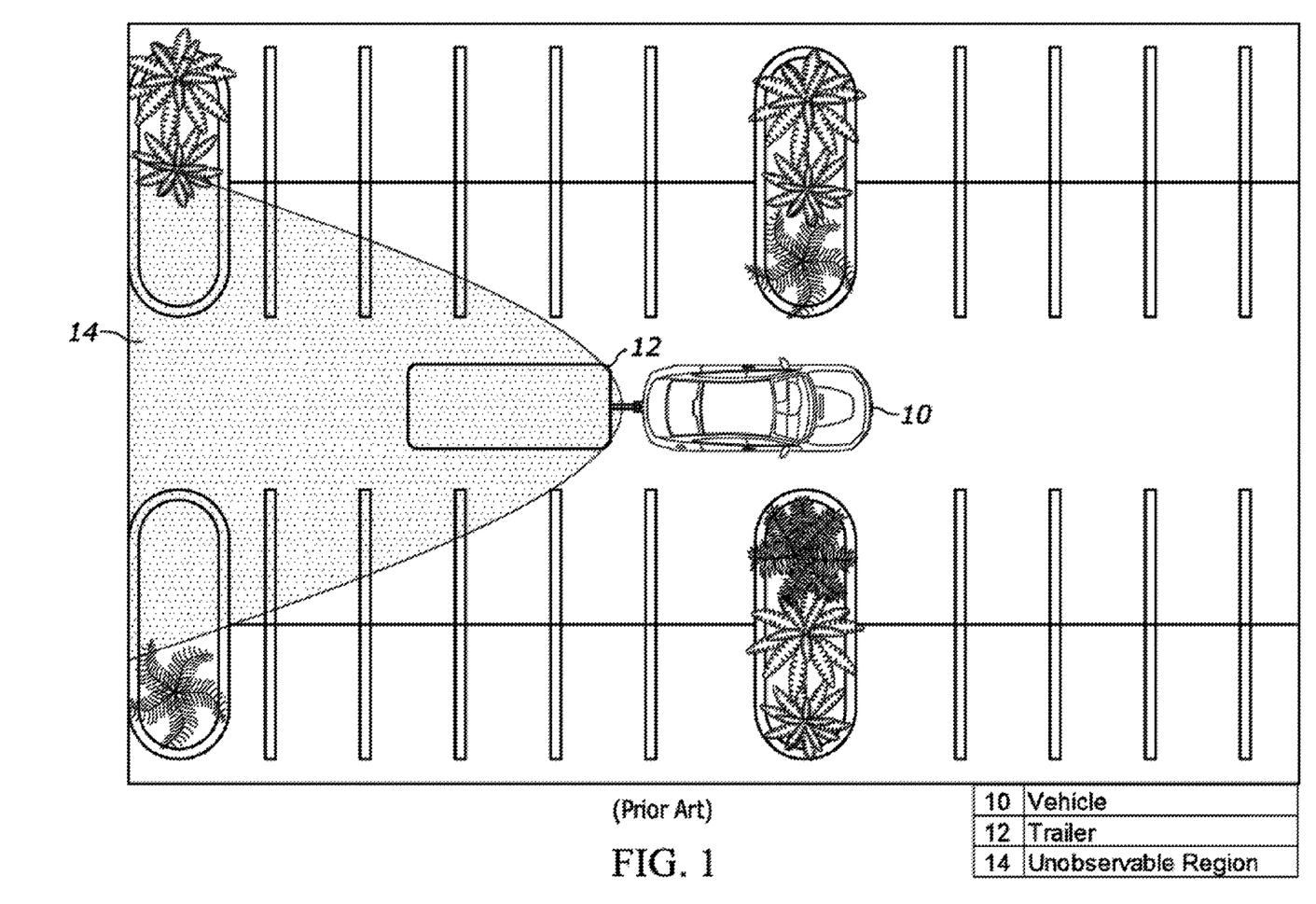
FIG. 1 is a conventional overhead surround view image of the vehicle and trailer, showing an unobservable region caused by the trailer.
Figure 2:
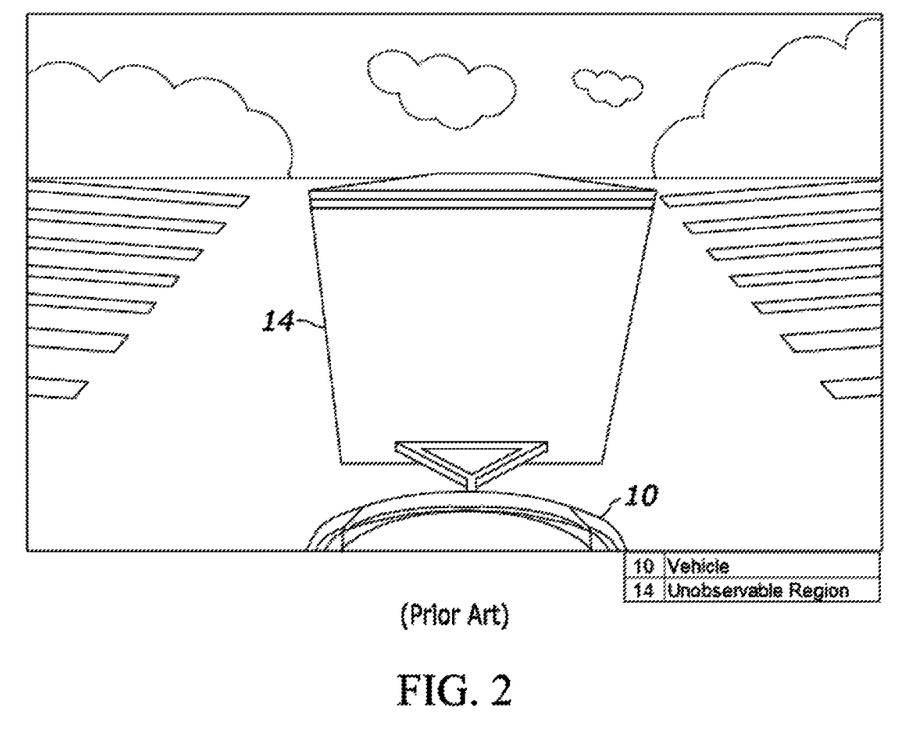
FIG. 2 is a rear view showing the unobservable region.
Figure 3:
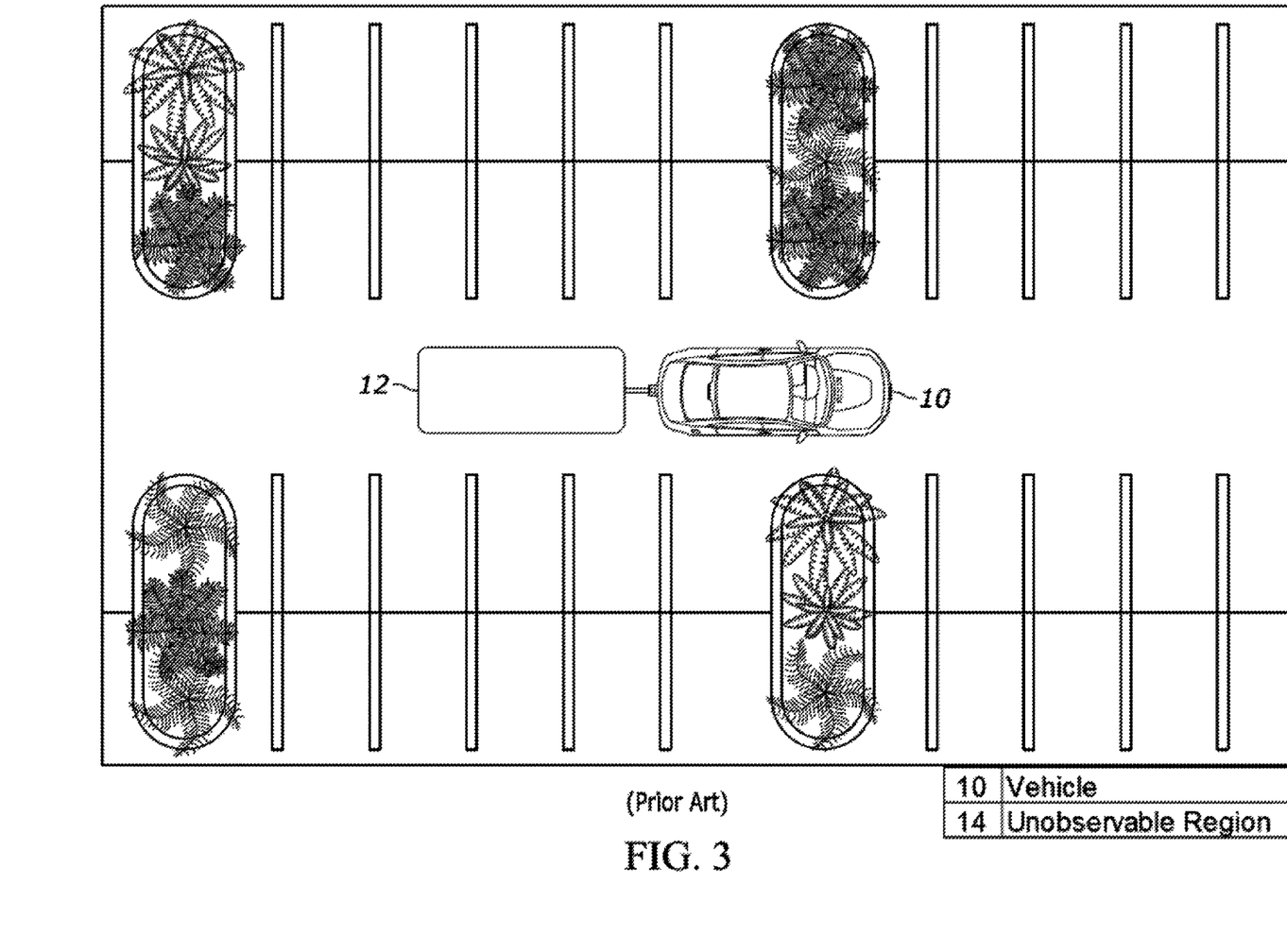
FIG. 3 is a conventional overhead surround view image of the vehicle and trailer of FIG. 1, obtained by driving to the present location and eliminating the unobservable region.

When reversing a vehicle with a trailer connected thereto, the driver's view of the area behind the trailer is partially occluded or unobservable. For example, FIG. 1 shows an overhead surround view from a conventional surround view system of a vehicle 10 and attached trailer 12 with an unobservable region 14 due to blockage by the trailer. FIG. 2 is a rear view of the conventional surround view system showing the unobservable region 14. The conventional surround view system can create and store a 3D model representation of the scene and localize the vehicle 10 and trailer 12 within it, since the front camera of the system has observed the scene when the vehicle passed through the scene. Thus, with reference to FIG. 3, such a view can be used to make the unobservable region 14 (see FIG. 1) visible allowing the driver to park a trailer in an area which has been previously observed by the surround view system. However, when presented such a view (FIG. 3), it is not obvious which regions are live observations and which regions are from legacy images. This poses a safety concern if any object (person, vehicle, etc.) should enter the blind spot unobserved by the driver.

Thus, there is a need to provide a surround view system and method for a vehicle reversing a trailer that that identifies and displays legacy unobservable regions to clearly indicate to the driver the lack of visibility and the potential threat of a dynamic target in such regions.

SUMMARY

An objective of the invention is to fulfill the need referred to above. In accordance with the principles of a present embodiment, this objective is achieved by providing a surround view system for a vehicle. The system includes a plurality of cameras mounted on the vehicle and constructed and arranged to provide generally a 360° view of an area surrounding the vehicle. An electronic control unit (ECU) is mounted on the vehicle and is constructed and arranged to receive image data from the cameras. The ECU includes a processor circuit and a memory circuit. The memory circuit is constructed and arranged to store a legacy observable image of the area obtained from the cameras as the vehicle passed through a portion of the area. A display is connected with the ECU for displaying an obstruction image to a driver of the vehicle. After the vehicle has passed through the portion of the area and is further being moved through the area, and when there is an obstruction in the area occluding at least a portion of a field of view of at least one of the cameras thereby defining an unobservable region, based on the legacy observable image, live images obtained from the cameras and on a geometry of the obstruction, the processor circuit is constructed and arranged to calculate at least one unobservable region in the area and to cause the unobservable region to be indicated in the obstruction image on the display. The system can be employed while backing-up a trailer connected to the vehicle, with the trailer defining the obstruction.

In accordance with another aspect of an embodiment, a method identifies an unobservable region using a surround view system of a vehicle. The vehicle has a trailer attached thereto. The surround view system includes a plurality of cameras mounted on the vehicle to provide generally a 360° view of an area surrounding the vehicle. An electronic control unit (ECU) is mounted on the vehicle and is constructed and arranged to receive image data from the cameras. A display is connected with the ECU. The method stores, in the ECU, a legacy observable image of the area obtained from the cameras as the vehicle passes through a portion of the area. A model representing a geometry of the trailer is created in the ECU. Live images of the area, as the vehicle is reversing the trailer in the area, are obtained by the cameras. With the trailer defining an obstruction in the area occluding at least a portion of a field of view of at least one of the cameras, based on the legacy observable image, the geometry of the trailer, and the live images obtained from the cameras, at least one unobservable region in the area is calculated in the ECU. The unobservable region is displayed in an image on the display.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 4:
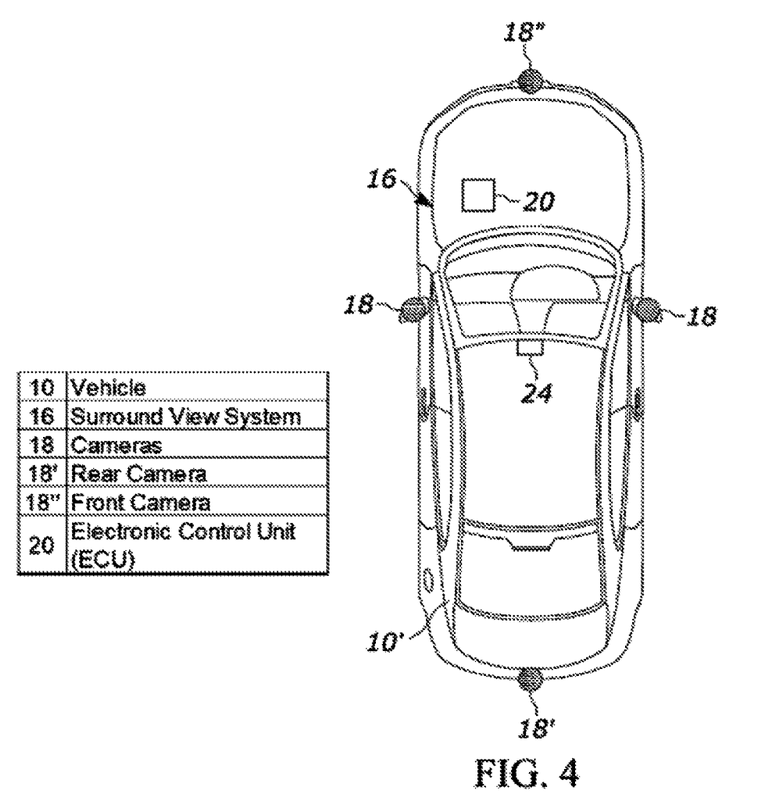
FIG. 4 is an overhead view of a vehicle having a surround view system in accordance with an embodiment.

With reference to FIG. 4, plan view of a vehicle 10' having a surround view system, generally indicated at 16, is shown in accordance with an embodiment. The surround view system may be of the type disclosed in U.S. Pat. No. 10,093,233 B2, the entire content of which is hereby incorporated by reference into this specification. Thus, the surround view system includes a plurality of cameras 18. In the embodiment, there are four cameras, two side cameras 18, a rear camera 18' and a front camera 18". Each camera 18 is preferably a fish eye camera having a horizontal viewing angle of about 180 degrees and a vertical viewing angle of about 130 degrees. Thus, the entire 360 degree vehicle environment can be observed with only four cameras. Of course, if desired, additional cameras can be employed.

Figure 5:
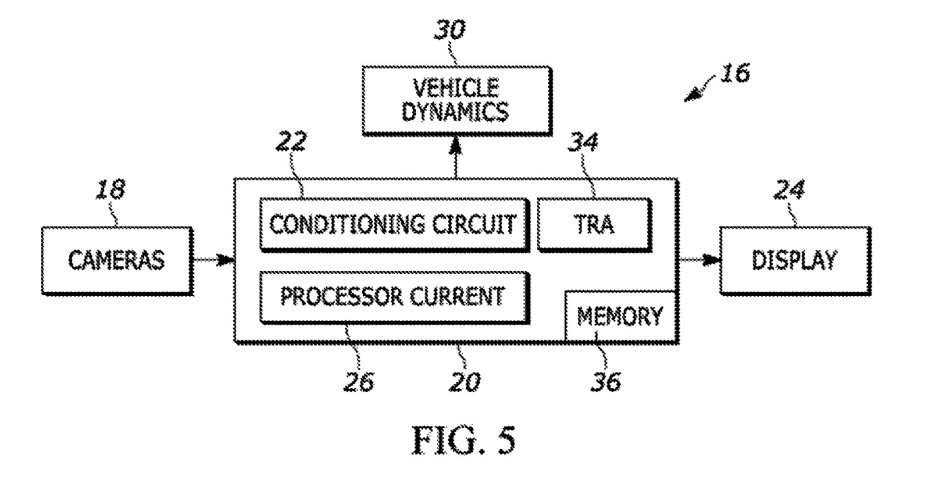
FIG. 5 is a block diagram of the surround view system of an embodiment.

With reference to FIG. 5, the surround view system 16 includes an electronic control unit (ECU) 20. The output from each camera 18 is received by the ECU 20. Preferably, the ECU 20 includes a signal conditioning circuit 22 that conditions the data received from the cameras 18 to produce raw image data and/or conditioned image data. The signal conditioning circuit 22 can be separate from the ECU 20 if desired. The signal conditioning circuit 22 is connected to a display 24, located in vehicle's passenger compartment, to display the conditioned image data to the driver. A processor circuit 26 receives conditioned image data from the signal conditioning circuit 22 and based thereon can signal vehicle dynamics 30, such as devices for controlling vehicle parameters and/or vehicle functions. Thus, the surround view system 20 creates a 3D model representation of the vehicle environment. The ECU 20 can be part of any computer unit of the vehicle 10'.

Figure 6A:
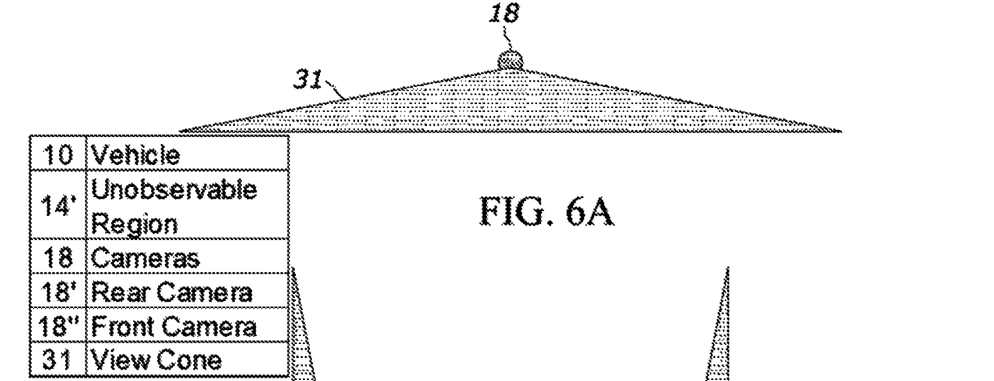
FIG. 6A shows an example field of view cone of one of the cameras of the surround view system of FIG. 4.
Figure 6B:
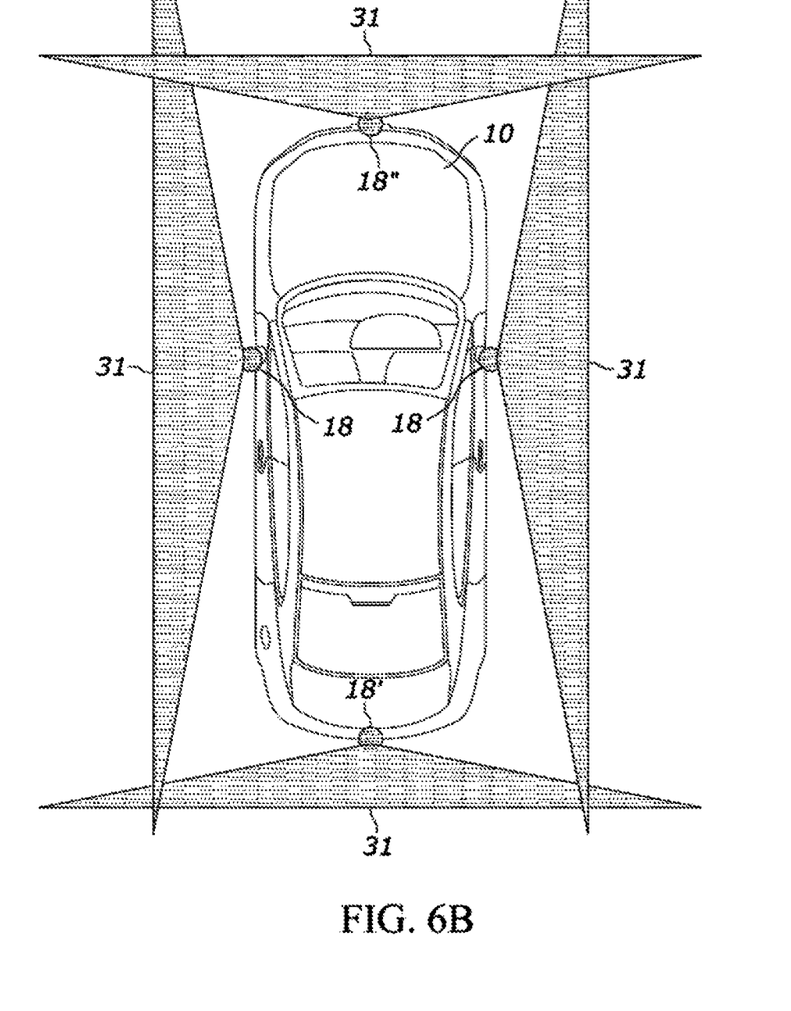
FIG. 6B shows examples of field of view cones for all cameras of the surround view system of FIG. 4.
Figure 7A:
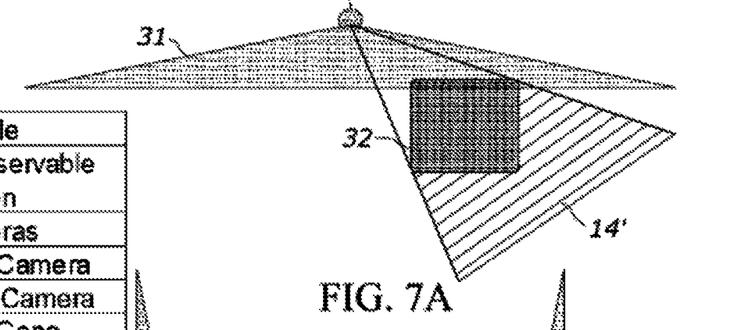
FIG. 7A shows an example field of view cone of FIG. 6A, with an obstruction in the field of view cone.
Figure 7B:
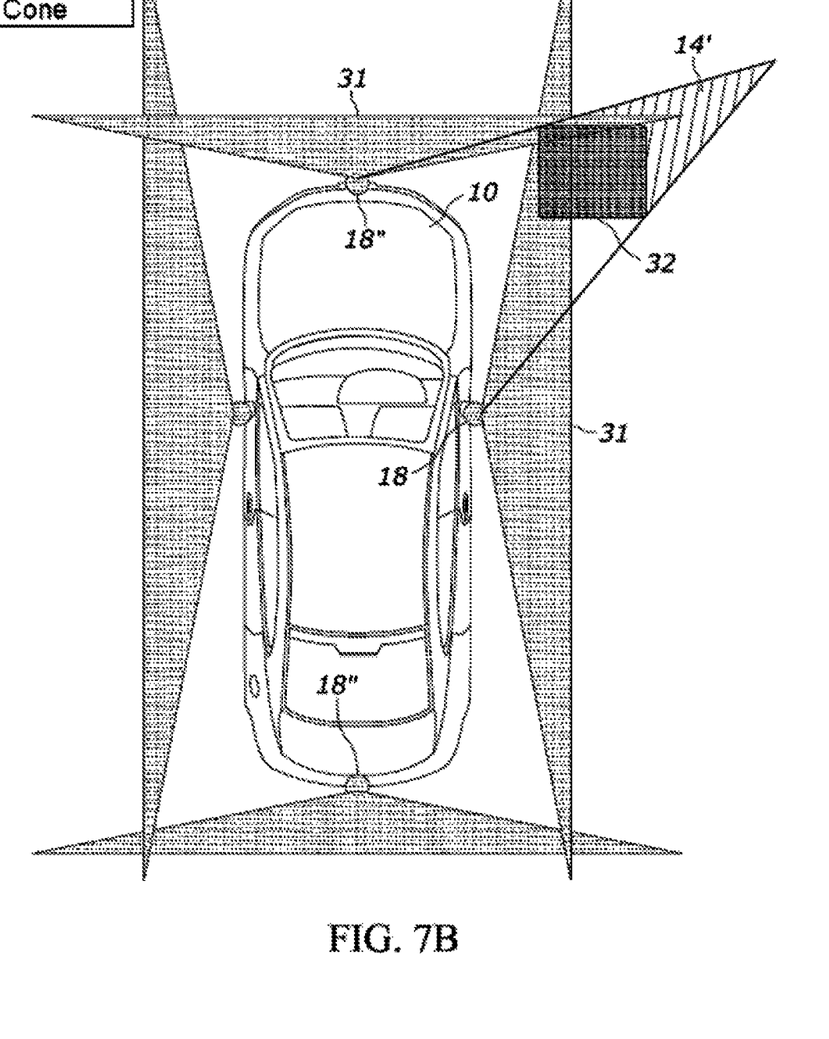
FIG. 7B shows examples of field of view cones of FIG. 6B, with an obstruction in one or more field of view cones.

FIG. 6A shows an example field of view cone 31 of one of the cameras 18 of the surround view system 20. FIG. 6B shows examples of field of view cones 31 for all cameras 18 simultaneously used by the surround view system 20. FIG. 7A shows an example field of view cone 31 of FIG. 6A, with an obstruction 32 in the field of view cone defining an unobservable region 14 due to the geometry of the obstruction. FIG. 7B shows examples of field of view cones 31 of FIG. 6B, with an obstruction 32 in one or more field of view cones unobservable region 14, based on the geometry of the obstruction. Thus, as with the conventional system of FIG. 1, when an obstruction 32 is in a camera's field of view, unobservable regions will exist.

Since a trailer 12 can be attached to the vehicle 10', the ECU 20 or a separate ECU includes a conventional Trailer Reverse Assist (TRA) 34 module for assisting the vehicle 10' in backing-up of the trailer 12 coupled thereto. The TRA module 34 is preferably of the type disclosed in U.S. Pat. No. 9,751,561, the entire content of which is hereby incorporated by reference into this specification. The TRA module 34 can employ the rear camera 18' (or use a separate camera) to create a 3D model representing the trailer geometry and can track the current position of the trailer 12 in the area behind the vehicle 10'. The 3D model and tracking images are provided to the processor circuit 26.

Figure 8:
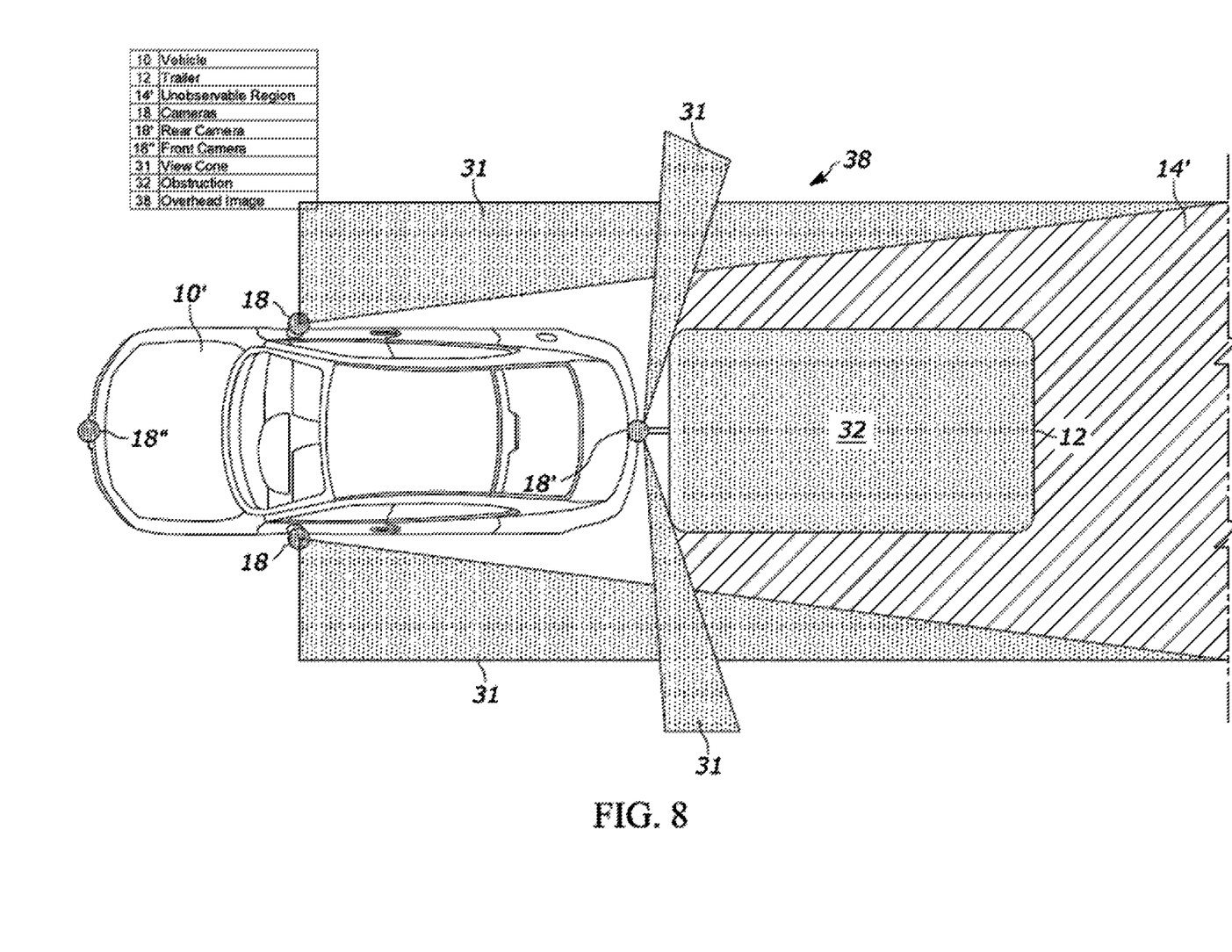
FIG. 8 an overhead view of the vehicle of FIG. 4 towing a trailer and identifying legacy unobservable regions.

When the vehicle 10' pulls the trailer 12 through an area, the surround view system 20 creates and stores in memory circuit 36, a 3D model representation of the scene and localizes the vehicle 10 and trailer 12 within it, since the front camera 18" of the system 20 has observed the area when the vehicle passed through the area. This defines a legacy observable image. The vehicle 10' can then be placed in reverse to back-up the trailer 12. FIG. 8 shows field of view cones 31 while backing the trailer 12, with the trailer defining an obstruction 32, blocking at least portions of field of views of some of the cameras 18 and thus defining an unobservable region 14'. Since the geometry of the trailer 12 is known from module 34, this unobservable region 14' (cross-hatched region in FIG. 8) is precisely calculated by the processor circuit 26 of the ECU 20 based on a comparison of the legacy observable image and the live images obtained by the cameras 18. The unobservable region 14' is then presented to the driver as a surround view image 38 on the display 24. In the embodiment, the surround view image 38 is preferably and overhead image.

However, should a dynamic target (e.g., person or vehicle) enter into this unobservable region 14 and stop while the trailer is being reversed, this dynamic target will not be displayed in the overhead image 38 on the display 24. While it is helpful to show a detailed unobstructed overhead image to the driver while backing a trailer as in the conventional system (FIG. 3), the embodiment advantageously includes in the overhead image 38, the location of the blind spots 14' to clearly indicate to the driver the lack of visibility and threat of dynamic targets that could enter the unobservable regions or blind spots 14'. The overhead image 38 on the display 24 can include a text message on the screen informing the driver of the legacy image and can include a color filter, transparency or texture identifying the unobservable region 14'.

The shape of the unobservable region 14' is preferably recalculated as the trailer swings relative to the vehicle 10'. The shape of the unobservable region 14' is preferably computed based on the shape of the specific trailer being pulled since obstruction caused by different types of trailers can vary. It is noted that while the embodiment discloses an overhead image 38 for showing the unobservable region 14', the same 3D data/model can generate a virtual viewpoint from any desired location.

The use of the surround view system 20 of the embodiment is not limited to use with a trailer. Thus, with reference to FIGS. 7A and 7B, when a trailer is not being towed and an obstruction 32 blocks portions of one or more cameras 18, the unobservable region 14' (cross-hatched region) is precisely calculated by the processor circuit 26 of the ECU 20 based on the legacy observable image, the live images obtained from the cameras and on the geometry of the obstruction 32. The unobservable region is then presented to the driver in an overhead image on the display 24.

The operations and algorithms described herein can be implemented as executable code within the processor circuit 26 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 36 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A surround view system for a vehicle, the vehicle releasably attached to a trailer, the system comprising:
    a plurality of cameras mounted on the vehicle and constructed and arranged to provide generally a 360° view of an area surrounding the vehicle,
    an electronic control unit (ECU) mounted on the vehicle and constructed and arranged to receive image data from the cameras, the ECU including a processor circuit and a memory circuit, the memory circuit being constructed and arranged to store a legacy observable image of the area obtained from the cameras as the vehicle passed through a portion of the area in a first direction and is further being moved through the area, and
    a display connected with the ECU for displaying a surround view image to a driver of the vehicle, the surround view image including an obstruction in the area occluding at least a portion of a field of view of at least one of the cameras positioned on a rear portion of the vehicle thereby defining an unobservable region, the trailer defining the obstruction,
    wherein, after the vehicle has passed through the portion of the area in the first direction and is further being moved through the area in a second direction opposite the first direction:
    the processor circuit calculates at least one unobservable region in the area based on the legacy observable image, and
    the processor circuit causes the unobservable region to be indicated in the surround view image on the display, wherein the unobservable area includes a color filter indicative of a lack of visibility of dynamic targets entering the unobservable area.

2. The system of claim 1, wherein the plurality of camera includes at least a front camera, a rear camera, and two side cameras.

3. The system of claim 2, wherein each camera is a fish-eye camera.

4. The system of claim 2, further comprising a trailer reverse assist module constructed and arranged, together with at least the rear camera, to create a 3D model representing a geometry of a trailer attached to the vehicle and to track, via at least the rear camera, a current position of the trailer in the area behind the vehicle, the 3D model and tracking images being received by the processor circuit.

5. The system of claim 1, wherein the surround view image includes an overhead image of the vehicle together with the unobservable region.

6. The system of claim 1, wherein the surround view image includes an overhead image of the vehicle and trailer together with the unobservable region.

7. A method of identifying an unobservable region using a surround view system of a vehicle, the surround view system including a plurality of cameras mounted on the vehicle to provide generally a 360° view of an area surrounding the vehicle, an electronic control unit (ECU) mounted on the vehicle and constructed and arranged to receive image data from the cameras, and a display connected with the ECU, the method comprising the step of:
    storing, in the ECU, a legacy observable image of the area obtained from the cameras as the vehicle passes through a portion of the area in a first direction,
    obtaining, with the cameras, live images of the area as the vehicle is further moved through the area in a second direction opposite the first direction,
    obtaining, with at least one of the cameras positioned on a rear portion of the vehicle, a geometry of an obstruction disposed in the area, a trailer defining the obstruction,
    when the obstruction is disposed in the area occluding at least a portion of a field of view of at least one of the cameras, based on the legacy observable image, the live images obtained from the cameras and on the geometry of the obstruction, calculating, in the ECU, at least one unobservable region in the area, and
    displaying the unobservable region in a surround view image on the display, wherein the unobservable area includes a color filter indicative of a lack of visibility of dynamic targets entering the unobservable area.

8. The method of claim 7, wherein the plurality of camera includes at least a front camera, a rear camera, and two side cameras.

9. The method of claim 8, wherein each camera is a fish-eye camera.

10. The method of claim 7, wherein the step of displaying the unobservable region includes using a color filter, transparency, or texture to identify the unobservable region.

11. The method of claim 7, wherein the step of displaying the surround view image includes displaying an overhead image of the vehicle together with the unobservable region.

12. A method of identifying an unobservable region using a surround view system of a vehicle, the vehicle having a trailer attached thereto, the surround view system including a plurality of cameras mounted on the vehicle to provide generally a 360° view of an area surrounding the vehicle, an electronic control unit (ECU) mounted on the vehicle and constructed and arranged to receive image data from the cameras, and a display connected with the ECU, the method comprising the step of:
    storing, in the ECU, a legacy observable image of the area obtained from the cameras as the vehicle passes through a portion of the area in a forward direction,
    creating, in the ECU, a model representing a geometry of the trailer,
    obtaining, with the cameras, live images of the area as the vehicle is reversing the trailer in the area,
    with the trailer defining an obstruction in the area occluding at least a portion of a field of view of at least one of the cameras, based on the legacy observable image, the geometry of the trailer, and the live images obtained from the cameras, calculating, in the ECU, at least one unobservable region in the area, and
    displaying the unobservable region in a surround view image on the display, wherein the unobservable area includes a color filter indicative of a lack of visibility of dynamic targets entering the unobservable area.

13. The method of claim 12, wherein the plurality of camera includes at least a front camera, a rear camera, and two side cameras.

14. The method of claim 13, wherein the step of creating a model includes using a trailer reverse assist module of the vehicle and the rear camera.

15. The method of claim 13, wherein each camera is a fish-eye camera.

16. The method of claim 13, wherein the step of displaying the unobservable region includes using a color filter, transparency, or texture to identify the unobservable region.

17. The method of claim 12, wherein the step of displaying the surround view image includes displaying an overhead image of the vehicle and the trailer together with the unobservable region.

\* \* \* \* \*